US011601023B2

(12) United States Patent
Matsumoto et al.

(10) Patent No.: US 11,601,023 B2
(45) Date of Patent: Mar. 7, 2023

(54) ROTARY ELECTRIC MACHINE

(71) Applicant: TOYOTA JIDOSHA KABUSHIKI KAISHA, Toyota (JP)

(72) Inventors: Takashi Matsumoto, Toyota (JP); Kenta Tabuchi, Nisshin (JP); Masachika Kawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 177 days.

(21) Appl. No.: 17/022,676

(22) Filed: Sep. 16, 2020

(65) Prior Publication Data

US 2021/0194297 A1    Jun. 24, 2021

(30) Foreign Application Priority Data

Dec. 19, 2019    (JP) .............................. JP2019-229095

(51) Int. Cl.
*H02K 1/20* (2006.01)
*H02K 1/32* (2006.01)
*H02K 9/19* (2006.01)

(52) U.S. Cl.
CPC ................. *H02K 1/20* (2013.01); *H02K 1/32* (2013.01)

(58) Field of Classification Search
CPC ............... H02K 9/12; H02K 9/19; H02K 1/20
USPC ............................... 310/52, 54, 60 A, 58, 61
See application file for complete search history.

(56) References Cited

U.S. PATENT DOCUMENTS

| 2,891,391 A * | 6/1959 | Kocher .................... F04D 25/06 62/505 |
| 2001/0036414 A1 | 11/2001 | Makino et al. |
| 2011/0127862 A1* | 6/2011 | Eichinger ................ H02K 3/24 310/61 |
| 2013/0009496 A1 | 1/2013 | Mäki-Ontto et al. |
| 2013/0119830 A1 | 5/2013 | Hautz et al. |
| 2014/0042841 A1 | 2/2014 | Rippel et al. |
| 2019/0027997 A1 | 1/2019 | Zeichfüssl |

FOREIGN PATENT DOCUMENTS

| CN | 102931739 A * | 2/2013 |
| GB | 2 012 118 A | 7/1979 |
| JP | 53-64703 A | 6/1978 |

(Continued)

*Primary Examiner* — Jose A Gonzalez Quinones
(74) *Attorney, Agent, or Firm* — Oblon, McClelland, Maier & Neustadt, L.L.P.

(57) ABSTRACT

Provided is a rotary electric machine including a rotor and a stator. The rotor includes a refrigerant passage. An axial direction of the rotor is along the horizontal direction. The stator is placed around the rotor and includes a tubular stator core. The stator core includes: a communication passage via which an inner peripheral surface of the stator core communicates with an outer peripheral surface of the tubular stator core such that the communication passage guides the refrigerant from the inner peripheral surface of the stator core to the outer peripheral surface of the stator core; and a projection portion provided on the outer peripheral surface of the tubular stator core such that the projection portion extends in the axial direction of the tubular stator core. The projection portion is placed downward in the gravitational direction from an opening of the communication passage on the outer peripheral surface.

9 Claims, 9 Drawing Sheets

(56) References Cited

FOREIGN PATENT DOCUMENTS

| | | | |
|---|---|---|---|
| JP | 53-125808 | U | 10/1978 |
| JP | 56-86871 | U | 12/1979 |
| JP | 3707250 | B2 | 10/2005 |
| JP | 2010154678 | A * | 7/2010 |
| JP | 2011036024 | A * | 2/2011 |
| JP | 2012-39846 | A | 2/2012 |
| JP | 2013-126280 | A | 6/2013 |
| JP | 2013-135543 | A | 7/2013 |
| JP | 2015-115994 | A | 6/2015 |
| JP | 2019-30098 | A | 2/2019 |
| JP | 2019-122160 | A | 7/2019 |
| JP | 2019-161999 | A | 9/2019 |

\* cited by examiner

ROTARY ELECTRIC MACHINE

CROSS-REFERENCE TO RELATED APPLICATION

This application claims priority to Japanese Patent Application No. 2019-229095 filed on Dec. 19, 2019, incorporated herein by reference in its entirety.

BACKGROUND

1. Technical Field

The present disclosure relates to a structure of a rotary electric machine, and more particularly, to a structure of a stator core.

2. Description of Related Art

A structure for cooling down a stator core or a coil end by causing refrigerant to flow along an outer peripheral surface of the stator core has been proposed. For example, there has been proposed such a structure that a rib is provided in an overhanging manner such that part of a stator cuff support attached to an axial end surface of a stator is extended in the axial direction on a cylindrical outer peripheral surface of a stator core, and refrigerant flowing along the outer peripheral surface of the stator core from an upper part of the outer peripheral surface is guided to a coil end provided in the axial end surface of the stator (e.g., see Japanese Unexamined Patent Application Publication No. 2019-30098 (JP 2019-30098 A)).

Further, there has been proposed such a structure that a refrigerant guide extending in the axial direction so as to project radially outward is provided on an outer peripheral surface of a stator core, and refrigerant supplied to an upper part of the stator core and flowing along the outer peripheral surface of the stator core is guided to a coil end (e.g., see Japanese Unexamined Patent Application Publication No. 2015-115994 (JP 2015-115994 A)).

Further, there has been proposed such a structure that a groove extending in the circumferential direction is provided on an outer peripheral surface of a stator core such that refrigerant supplied to an upper part of the stator core flows through the outer peripheral surface of the stator core along the outer peripheral surface of the stator core (e.g., see Japanese Unexamined Patent Application Publication No. 2019-122160 (JP 2019-122160 A)).

SUMMARY

However, there is room for improvement in cooling performance of the rotary electric machines in the related art as described in JP 2019-30098 A, JP2015-115994 A, and JP 2019-122160 A. In view of this, the present disclosure provides a rotary electric machine that improves cooling performance of the rotary electric machine.

An aspect of the present disclosure relates to a rotary electric machine including a rotor and a stator. The rotor includes a refrigerant passage via which a rotor inner peripheral surface communicates with a rotor outer peripheral surface such that the refrigerant passage guides refrigerant from the rotor inner peripheral surface to the rotor outer peripheral surface. The axial direction of the rotor is along the horizontal direction. The stator is placed around the rotor and includes a tubular stator core including a communication passage and a projection portion. The inner peripheral surface of the stator core communicates with an outer peripheral surface of the stator core via the communication passage. The communication passage is configured to guide the refrigerant, which flows out from the refrigerant passage of the rotor to the inner peripheral surface of the stator core, to the outer peripheral surface of the stator core. The projection portion is provided on the outer peripheral surface to extend in the axial direction of the stator core and is placed downward in the gravitational direction from an opening of the communication passage on the outer peripheral surface.

In the rotary electric machine according to the aspect of the present disclosure, the refrigerant supplied from the rotor is caused to flow to the outer peripheral surface of the stator core from the communication passage provided in the stator core. This makes it possible to cool down the stator core from both the inner peripheral surface of the stator core and the outer peripheral surface of the stator core, thereby making it possible to improve cooling performance. Further, the projection portion is provided downward in the gravitational direction from the opening. Accordingly, the refrigerant flowing along the outer peripheral surface of the stator core can be guided to coil ends of the stator, so that the coil ends can be cooled down. Further, the communication passage can be provided in a given part, so that a specific region of the stator core can be cooled down.

In the rotary electric machine of the above aspect, the stator core may include a plurality of fixed portions projecting radially from the outer peripheral surface of the stator core and extending in the axial direction such that the fixed portions are fixed to the casing. A plurality of communication passages and a plurality of projection portions may be provided in the circumferential direction of the stator core. The communication passages may be placed in a whole circumference of the outer peripheral surface of the stator core except parts where the fixed portions are provided, and the projection portions may be placed in a whole circumference of the outer peripheral surface of the stator core except parts where the fixed portions are provided.

In the rotary electric machine according to the above aspect, the refrigerant flowing through the communication passage placed in an upper half part of the stator core cools down the stator core from its inner peripheral surface and flows out from the opening to the outer peripheral surface of the stator core, and after that, the refrigerant flows on the outer peripheral surface of the stator core in the circumferential direction or the axial direction, so that the refrigerant cools down the outer peripheral surface of the stator core and the coil ends. In the meantime, the refrigerant flowing through the communication passage placed in a lower half part of the stator core cools down a lower side part of the stator core from its inner peripheral surface. This makes it possible to cool down the stator core from the whole circumference, thereby making it possible to improve the cooling performance.

In the rotary electric machine of the above aspect, the communication passages and the projection portions may be placed equally in the circumferential direction.

In the rotary electric machine according to the above aspect, the communication passages and the projection portions are placed equally in the circumferential direction. This makes it possible to uniformize the flow of the refrigerant on the outer peripheral surface, thereby making it possible to improve the cooling performance.

In the rotary electric machine of the above aspect, the stator core may be formed in a tubular shape by laminating toric electromagnetic steel sheets. The communication passages may be placed in axial symmetry to a rotational central axis of the rotor, and the projection portions may be placed in axial symmetry to a rotational central axis of the rotor.

In the rotary electric machine according to the above aspect, even in a case where the electromagnetic steel sheets are provided by rotary lamination, the communication passages and the projection portions can be formed.

In the rotary electric machine of the above aspect, the stator core may be formed in a tubular shape by laminating plates each formed in a toric shape by compression molding of iron powder. The communication passages may be placed in axial symmetry to a rotational central axis of the rotor, and the projection portions may be placed in axial symmetry to a rotational central axis of the rotor.

In the rotary electric machine according to the above aspect, even in a case where the plates formed into a toric shape by compression molding of iron powder are provided by rotary lamination, the communication passages and the projection portions can be formed.

In the rotary electric machine of the above aspect, a plurality of projection portions may extend from a first end of the stator core to a second end of the stator core in the axial direction.

In the rotary electric machine according to the above aspect, the refrigerant flowing out from the opening of the communication passage can be effectively guided to the coil ends, thereby making it possible to improve cooling performance for the coil ends.

In the rotary electric machine of the above aspect, a plurality of communication passages may be placed in a central part of the stator core in the axial direction.

In the rotary electric machine according to the above aspect, the stator core can be uniformly cooled down in the axial direction from its inner peripheral surface, thereby making it possible to improve the cooling performance. Further, the flow of the refrigerant directed from the opening of the communication passage to the opposite sides of the projection portion in the axial direction can be made uniform, thereby making it possible to improve the cooling performance.

In the rotary electric machine of the above aspect, the projection portion may have a square or trapezoidal sectional shape.

In the rotary electric machine according to the above aspect, the passage through which the refrigerant flows in the axial direction can be formed between a root of the projection portion and the outer peripheral surface of the stator core, so that the refrigerant can be effectively guided to the coil ends.

As described above, with the rotary electric machine of the present disclosure, it is possible to improve the cooling performance of the rotary electric machine.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
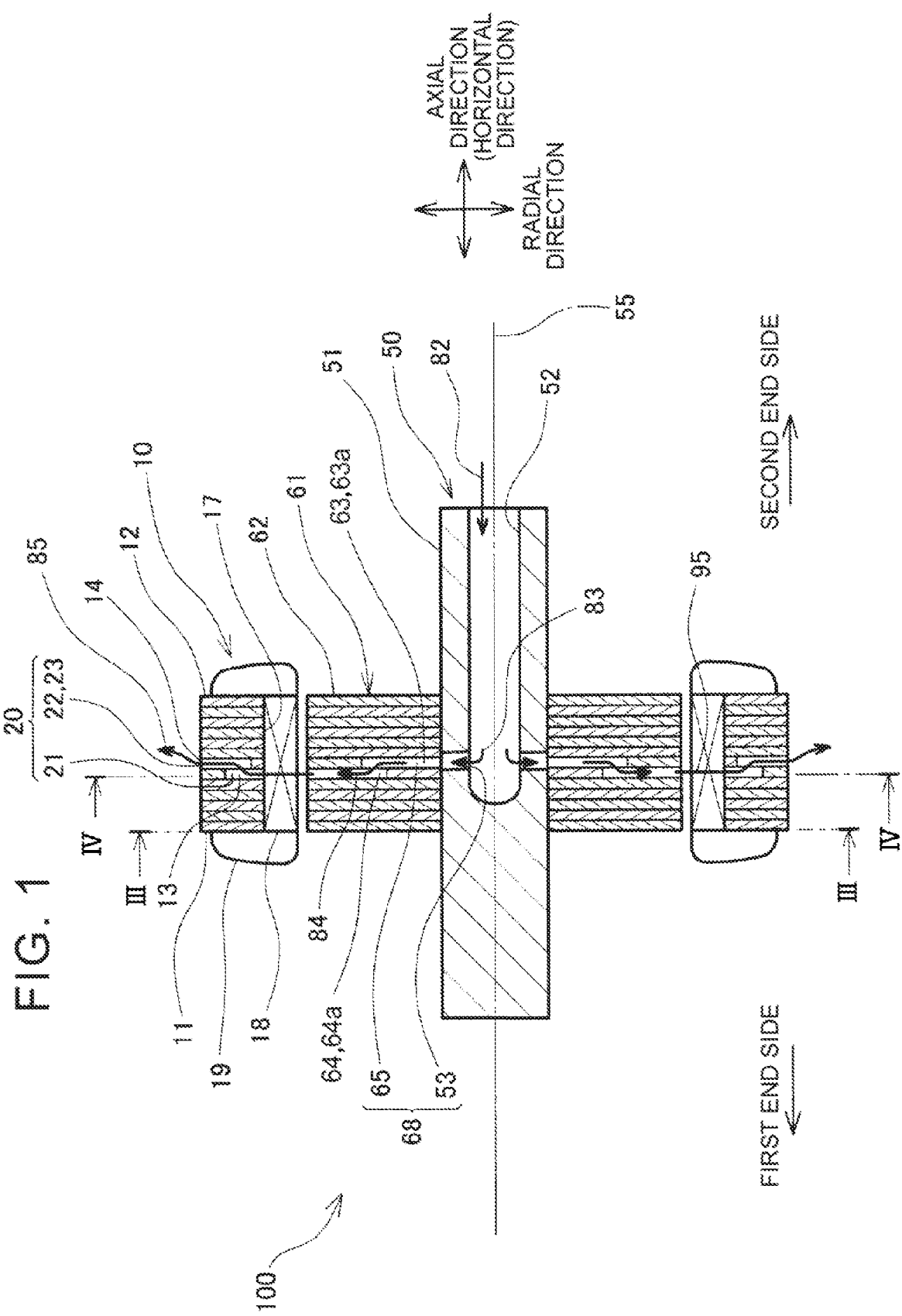
FIG. 1 is a sectional view of a rotary electric machine of a first embodiment of the present disclosure.

With reference to the drawings, the following describes a rotary electric machine 100 of a first embodiment. Here, the rotary electric machine 100 may be a motor, a generator, or a motor generator. As illustrated in FIG. 1, the rotary electric machine 100 includes a rotor 50, and a stator 10 placed around the rotor 50, and the rotary electric machine 100 is placed such that the axial direction of the rotor 50 is along the horizontal direction.

Figure 2:
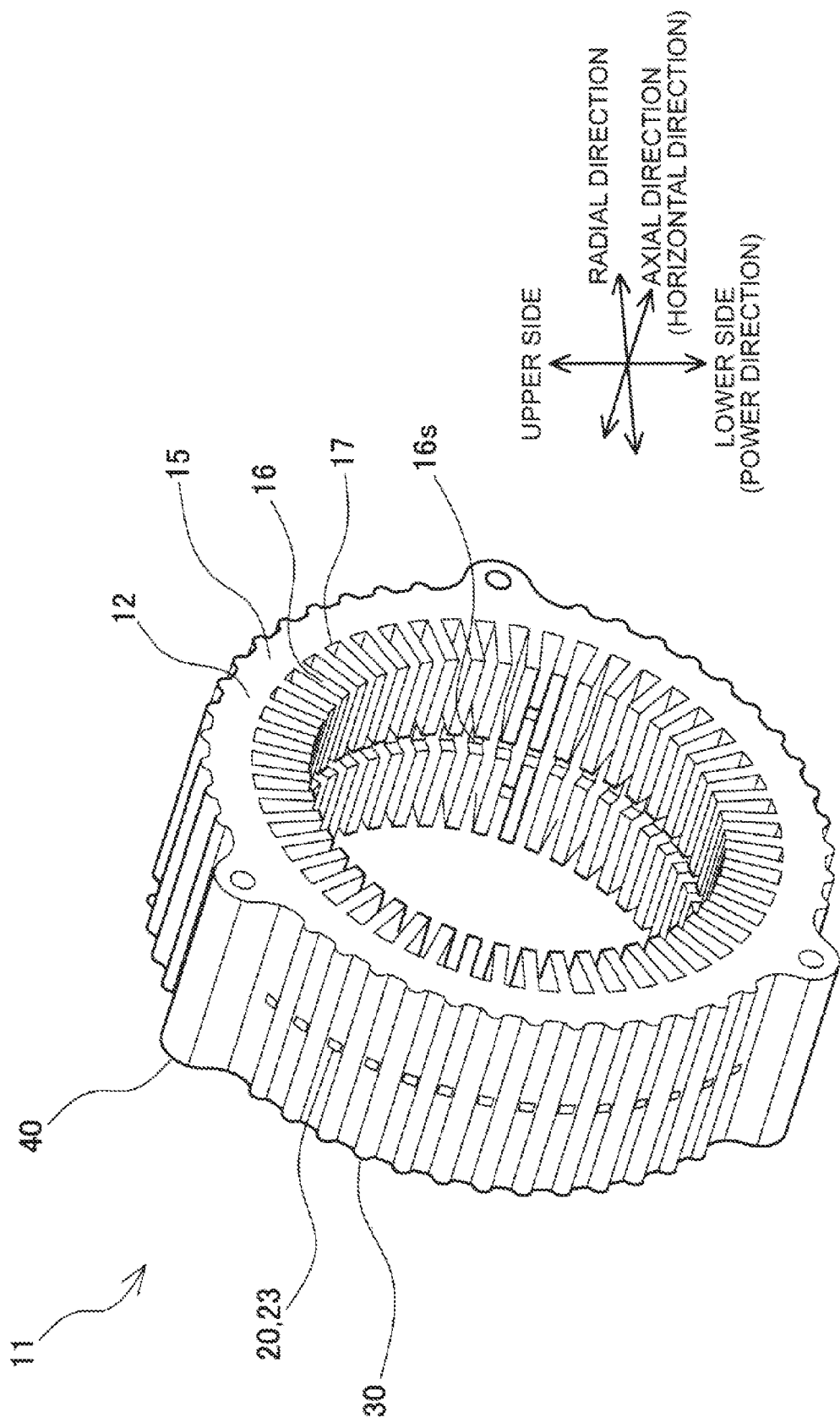
FIG. 2 is a perspective view of a stator core in the rotary electric machine of the first embodiment.

The stator 10 includes a stator core 11, coils 18, and coil ends 19. As illustrated in FIG. 2, the stator core 11 includes a yoke 15, teeth 16 projecting radially inwardly from the yoke 15, slots 17 each provided between corresponding teeth 16, a plurality of communication passages 20 via which the inner peripheral surface of the stator core 11 communicates with an outer peripheral surface of the stator core 11, a plurality of projection portions 30 provided on the outer peripheral surface of the stator core 11 such that the projection portions 30 extend in the axial direction, and fixed portions 40 fixed to a casing.

Figure 3:
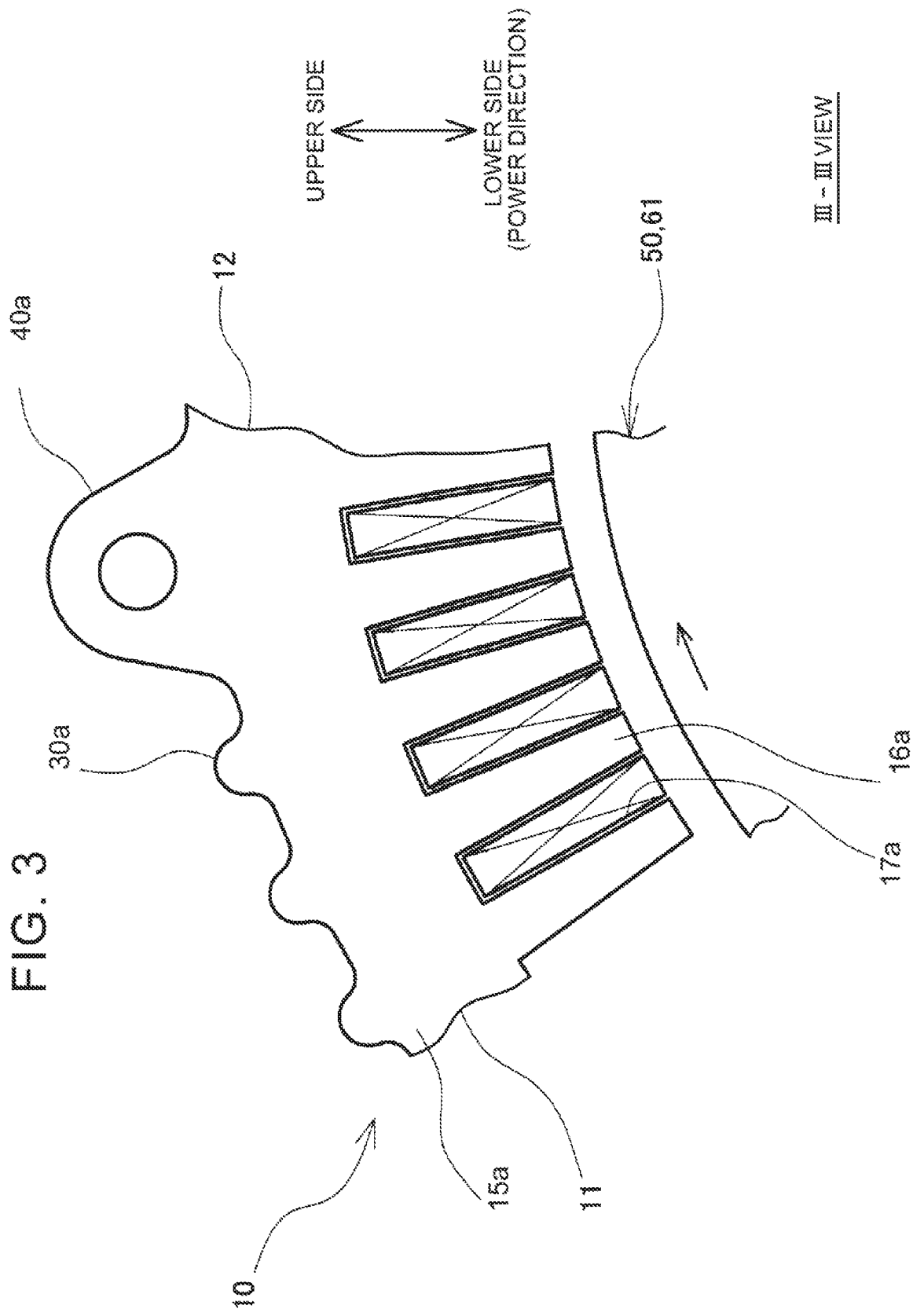
FIG. 3 is a view of the rotary electric machine taken along a line in FIG. 1 and illustrates a first end surface of laminated electromagnetic steel sheets of the stator core when the first end surface is viewed from the axial direction.

As illustrated in FIG. 3, the stator core 11 is formed into a cylindrical shape by laminating toric electromagnetic steel sheets 12 each punched in a shape having the yoke 15, the teeth 16, the slots 17, the projection portions 30, and the fixed portions 40. The electromagnetic steel sheets 12 each include a yoke forming portion 15a, tooth forming portions 16a, slot forming portions 17a, projection-portion forming portions 30a, and fixed-portion forming portions 40a respectively for forming the yoke 15, the teeth 16, the slots 17, the projection portions 30, and the fixed portions 40 when the electromagnetic steel sheets 12 are laminated. Here, the projection-portion forming portion 30a has a half-round shape.

Figure 4:
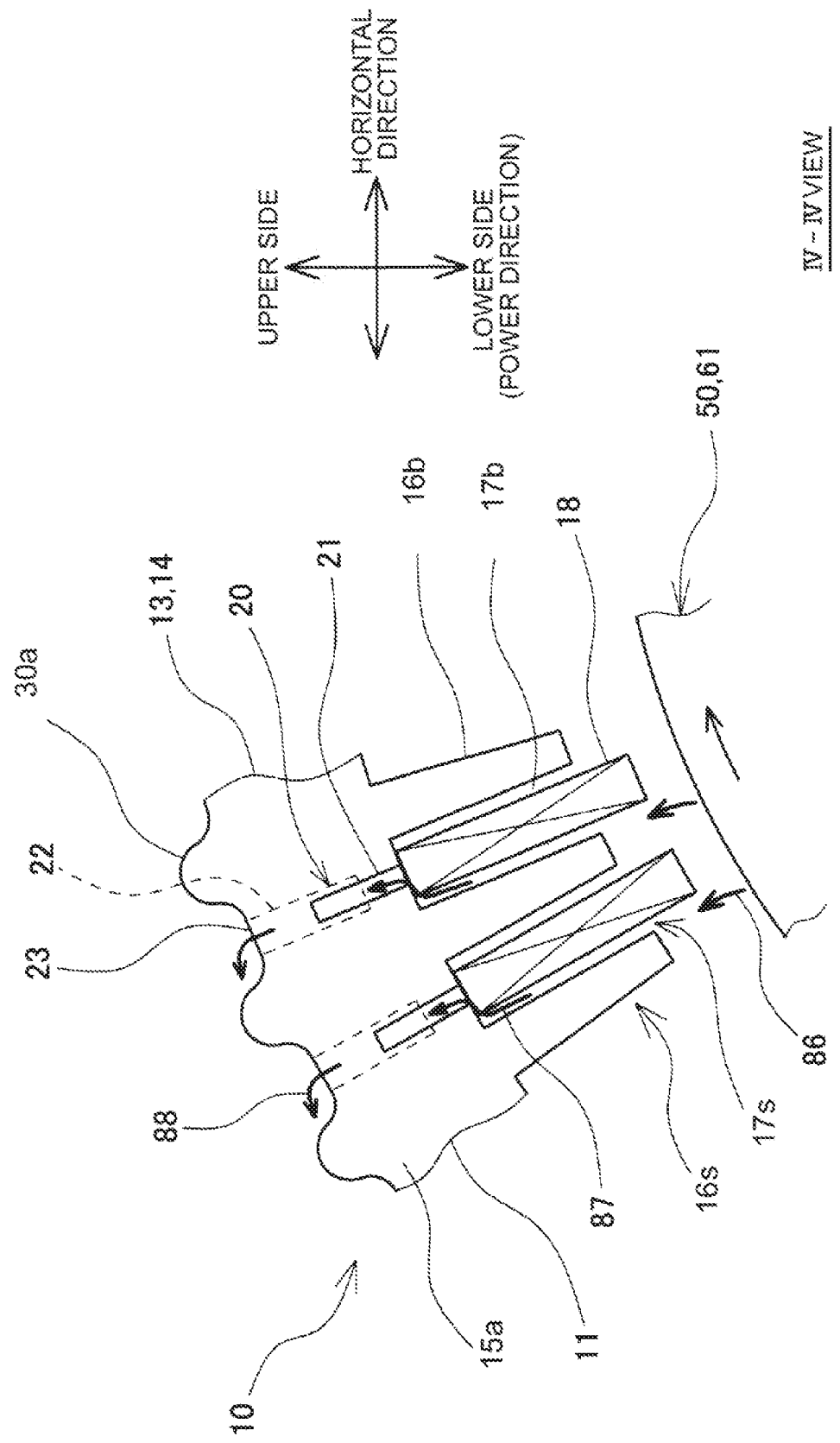
FIG. 4 is a view of the rotary electric machine taken along a line IV-IV in FIG. 1 and partially illustrates an upper half of an electromagnetic steel sheet provided with a communication passage when the upper half of the electromagnetic steel sheet is viewed from the axial direction.

As illustrated in FIG. 4, differently from the electromagnetic steel sheets 12 provided in other parts of the stator core 11 in the axial direction, an electromagnetic steel sheet 13 provided in a central part of the stator core 11 in the axial direction and an electromagnetic steel sheet 14 laminated on a second end side of the electromagnetic steel sheet 13 are configured such that tooth forming portions 16b to form the teeth 16 are smaller than the tooth forming portions 16a of the electromagnetic steel sheet 12 illustrated in FIG. 3, and the radial length of the tooth forming portions 16b is shorter than the radial length of the tooth forming portions 16a of the electromagnetic steel sheet 12. Further, the width of slot forming portions 17b is wider than the width of the slot forming portions 17a of the electromagnetic steel sheet 12. When the electromagnetic steel sheets 13, 14 are laminated in the axial direction, teeth 16s having a width narrower than that of the teeth 16 and a radial length shorter than that of the teeth 16 are provided, the teeth 16 being provided when the electromagnetic steel sheets 12 are laminated.

The electromagnetic steel sheet 13 is provided with an inside-diameter-side slit 21 extending radially outwardly from a bottom portion of the slot forming portion 17b. Further, as indicated by a broken line in FIG. 4, the electromagnetic steel sheet 14 is provided with an outside-diameter-side slit 22 an inside-diameter-side end portion of which axially faces an outer-diameter-side end portion of the inside-diameter-side slit 21. The outside-diameter-side slit 22 extends radially outwardly to an outer peripheral surface of the electromagnetic steel sheet 14. When the electromagnetic steel sheets 13, 14 are laminated in the axial direction, the inside-diameter-side slit 21 and the outside-diameter-side slit 22 constitute the communication passage 20 via which the inner peripheral surface of the stator core 11 communicates with the outer peripheral surface of the stator core 11. Further, an end portion, on the outer peripheral surface, of the outside-diameter-side slit 22 constitutes an opening 23, on the outer peripheral surface, of the communication passage 20.

The projection-portion forming portions 30a of the electromagnetic steel sheets 12, 13, 14 are placed side by side in the circumferential direction, and a plurality of inside-diameter-side slits 21 and a plurality of outside-diameter-side slits 22 of the electromagnetic steel sheets 13, 14 are placed side by side in the circumferential direction between the projection-portion forming portions 30a. Note that, in a region where the fixed-portion forming portion 40a is provided, the projection-portion forming portion 30a, the inside-diameter-side slit 21, and the outside-diameter-side slit 22 are not provided. On this account, when the electromagnetic steel sheets 12, 13, 14 are laminated, the projection portions 30 having a half-round sectional shape and extending from a first end to a second end of the stator core 11 in the axial direction are provided side by side in the circumferential direction on the outer peripheral surface of the stator core 11 other than parts, of the outer peripheral surface, on which the fixed portions 40 are provided. Further, the communication passages 20 are provided side by side in the circumferential direction on the outer peripheral surface of the stator core 11 such that one communication passage 20 is provided between the projection portions 30 adjacent to each other in the circumferential direction. As such, the projection portions 30 and the communication passages 20 are placed in the whole circumference of the outer peripheral surface of the stator core 11 except the fixed portions 40. Further, in the stator core 11 of the first embodiment, the projection-portion forming portions 30a of the electromagnetic steel sheets 12, 13, 14, the inside-diameter-side slits 21, and the outside-diameter-side slits 22 are placed at regular intervals in the circumferential direction. On this account, on the outer peripheral surface of the stator core 11 except the fixed portions 40, the communication passages 20 and the projection portions 30 are placed equally. Further, as illustrated in FIG. 4, the inside-diameter-side slits 21 and the outside-diameter-side slits 22 of the electromagnetic steel sheets 13, 14 may be placed in the circumferential direction at intervals similar to circumferential pitches between the slots 17 or the teeth 16. In this case, the communication passages 20 are placed equally in the circumferential direction at pitches similar to the circumferential pitches between the teeth 16.

As illustrated in FIGS. 3, 4, the coils 18 are provided in a winding manner in the slots 17, 17s provided by laminating the electromagnetic steel sheets 12, 13, 14. As illustrated in FIG. 1, the coil ends 19 are provided on axial end surfaces of the stator core 11. As illustrated in FIG. 4, since the slots 17s provided by laminating the electromagnetic steel sheets 13, 14 are wider in width than the slots 17 provided by laminating the electromagnetic steel sheets 12, a gap is formed between each of the teeth 16 and its corresponding coil 18.

As illustrated in FIG. 1, the rotor 50 includes a shaft 51 and a rotor core 61. The shaft 51 has a central hole 52 provided in the center of the shaft 51 such that the central hole 52 extends in the axial direction. A plurality of through-holes 53 extending from the central hole 52 to an outer peripheral surface of the shaft 51 is provided in a central part of the shaft 51 in the axial direction.

The rotor core 61 is formed in a cylindrical shape by laminating toric electromagnetic steel sheets 62. An electromagnetic steel sheet 63 provided in a central part in the axial direction so as to correspond to the through-holes 53 provided in the shaft 51 is provided with inside-diameter-side slits 63a similar to those provided in the electromagnetic steel sheet 13 constituting the stator core 11. Further, an electromagnetic steel sheet 64 laminated on a first end side of the electromagnetic steel sheet 63 is provided with outside-diameter-side slits 64a similar to those provided in the electromagnetic steel sheet 14 constituting the stator core 11. When the electromagnetic steel sheets 63, 64 are laminated, the inside-diameter-side slits 63a and the outside-diameter-side slits 64a form communication passages 65 via which an inner surface of the rotor core 61 communicates with an outer peripheral surface of the rotor core 61.

The through-holes 53 of the shaft 51 and the communication passages 65 of the rotor core 61 constitute refrigerant passages 68 via which a rotor inner peripheral surface communicates with a rotor outer peripheral surface so that refrigerant is guided from the inner peripheral surface of the rotor 50 to the rotor outer peripheral surface.

The following describes the flow of the refrigerant in the rotary electric machine 100 configured as such and cooling of the stator 10 and the rotor 50, with reference to the drawings.

As indicated by an arrow 82 in FIG. 1, the refrigerant flows into the central hole 52 from a second end side of the shaft 51. The refrigerant axially flows in the central hole 52 to a first end side of the shaft 51. As indicated by arrows 83 in FIG. 1, the refrigerant flows radially outwardly from the through-holes 53 of the shaft 51 and passes through the inside-diameter-side slits 63a and the outside-diameter-side slits 64a of the rotor core 61, so that the refrigerant flows out radially outwardly from the outer peripheral surface of the rotor core 61.

Figure 6:
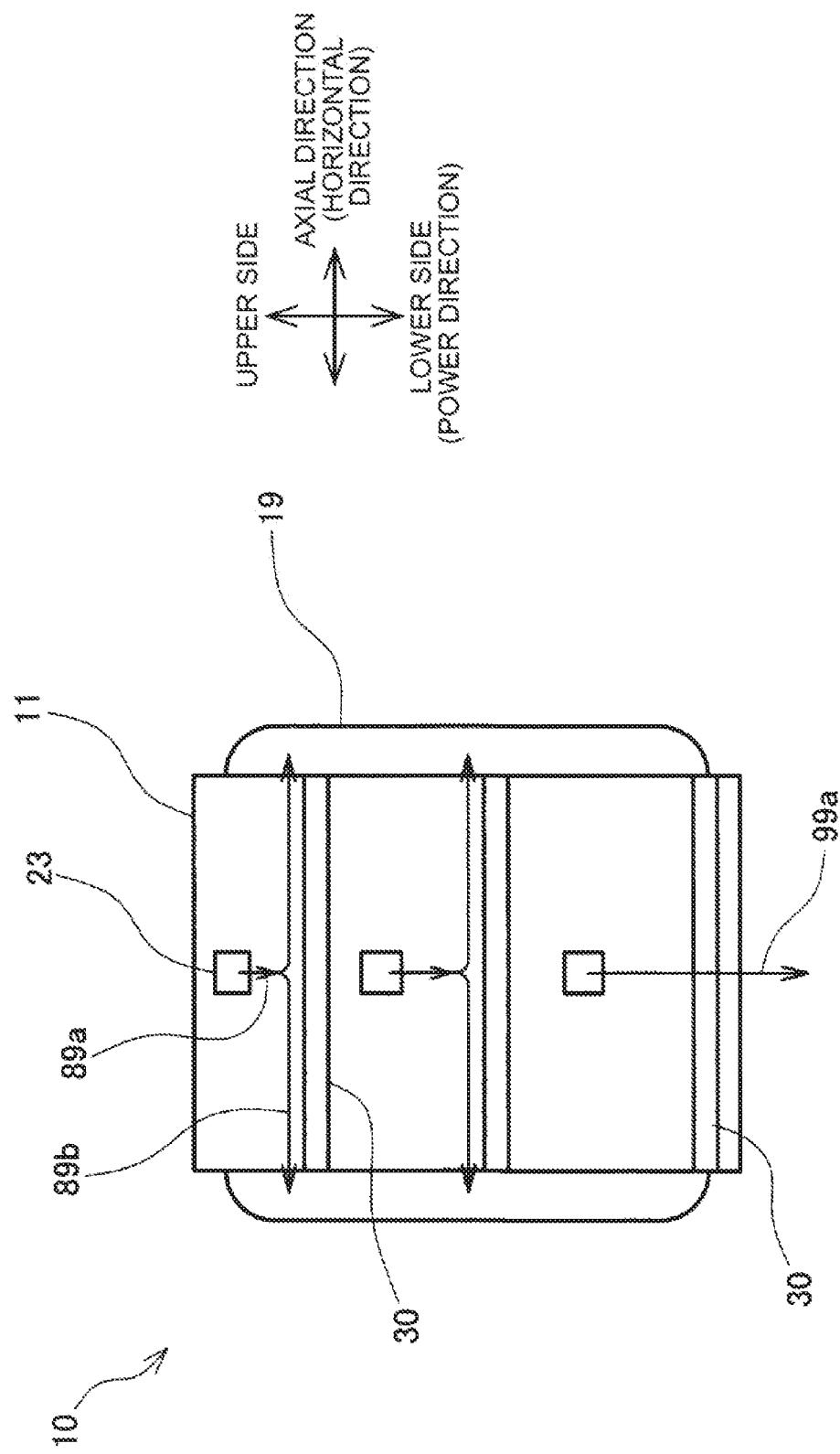
FIG. 6 is a schematic view illustrating a side face of a stator and illustrates the flow of refrigerant.

In an upper half part of the stator core 11, the refrigerant flowing out radially outwardly from the outer peripheral surface of the rotor core 61 flows into the slots 17s from the gaps between the teeth 16s and the coils 18 as indicated by arrows 86 in FIG. 4. Then, as indicated by arrows 87 in FIG. 4, the refrigerant passes through the inside-diameter-side slits 21 and the outside-diameter-side slits 22 of the stator core 11, and as indicated by an arrow 89a in FIG. 6 and arrows 88 in FIG. 4, the refrigerant flows out from the openings 23 on the outer peripheral surface of the stator core 11 to the outer peripheral surface. After the refrigerant thus flowing out to the outer peripheral surface of the stator core 11 flows downward in the gravitational direction along the outer peripheral surface as indicated by the arrow 89a in FIG. 6, the refrigerant flows in the axial direction along the projection portions 30 placed downward in the gravitational direction from the openings 23 as indicated by arrows 89b in FIG. 6, and then, the refrigerant reaches the coil ends 19.

Figure 5:
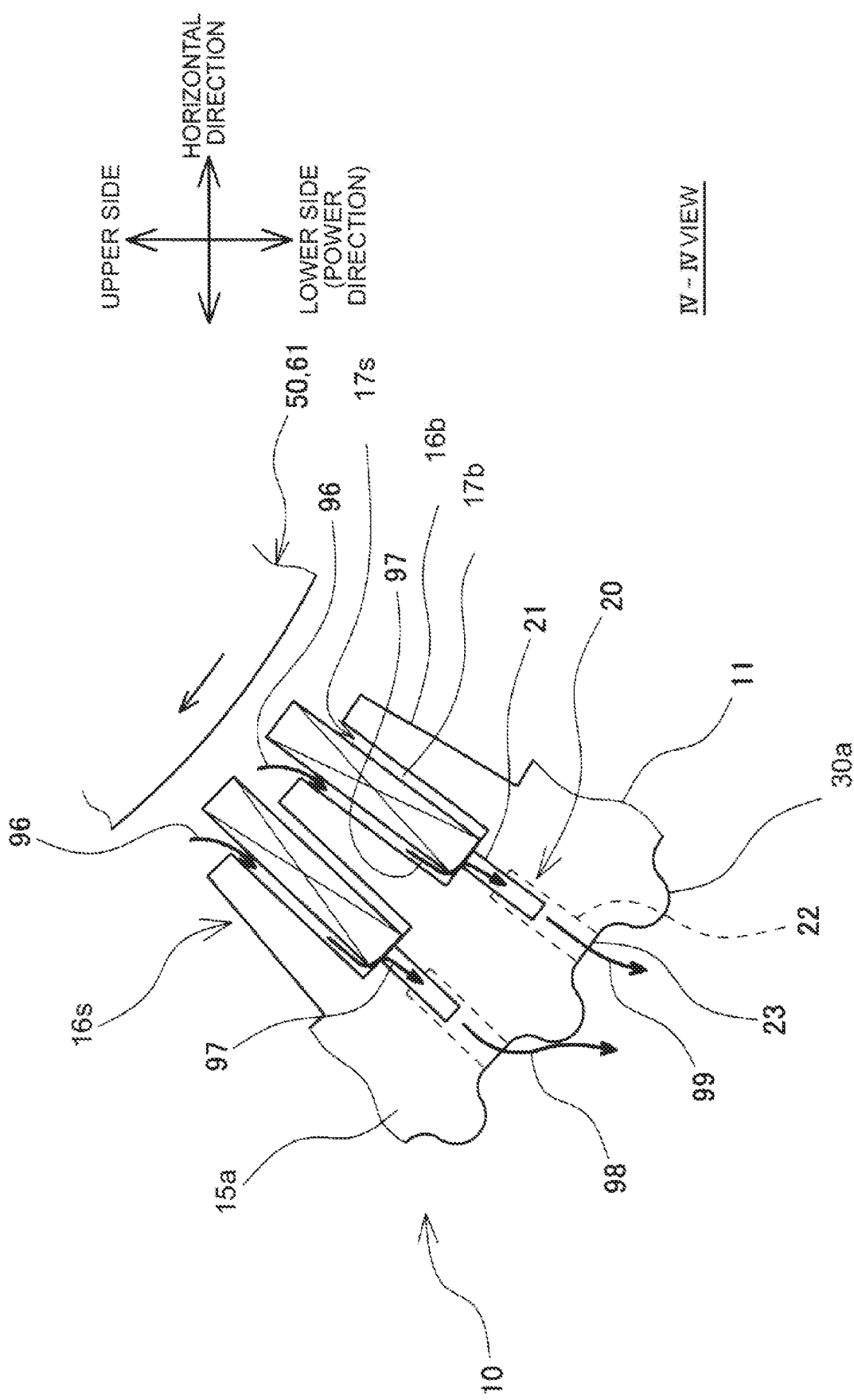
FIG. 5 is a view of the rotary electric machine taken along the line IV-IV in FIG. 1 and partially illustrates a lower half of the electromagnetic steel sheet provided with the communication passage when the lower half of the electromagnetic steel sheet is viewed from the axial direction.

In the meantime, in a lower half part of the stator core 11, the refrigerant flowing out radially outwardly from the outer peripheral surface of the rotor core 61 flows into the slots 17s from the gaps between the teeth 16s and the coils 18 as indicated by arrows 96 in FIG. 5. Then, as indicated by arrows 95 in FIG. 1, the refrigerant passes through the inside-diameter-side slits 21 and the outside-diameter-side slits 22 of the stator core 11, and the refrigerant flows out from the openings 23 on the outer peripheral surface of the stator core 11 to the outer peripheral surface. As indicated by arrows 98 in FIG. 5, the refrigerant thus flowing out to the outer peripheral surface flows downward in the gravitational direction along the outer peripheral surface of the stator core 11 and surfaces of the projection portions 30 by surface tension and falls downward in the gravitational direction from bottom ends of the projection portions 30. Further, when an angle to the lower side in the gravitational direction becomes large, the refrigerant falls downward in the gravitational direction directly from the openings 23 as indicated by an arrow 99 in FIG. 5 and an arrow 99a in FIG. 6.

As described above, the rotary electric machine 100 of the first embodiment is configured such that the refrigerant supplied from the rotor 50 flows to the outer peripheral surface of the stator core 11 from the communication passages 20 provided in the stator core 11, so that the stator core 11 can be cooled down from both the inner peripheral surface of the stator core 11 and the outer peripheral surface of the stator core 11. This makes it possible to improve cooling performance. Further, since the projection portions 30 are provided downward in the gravitational direction from the openings 23 of the communication passages 20, the refrigerant flowing along the outer peripheral surface of the stator core 11 can be guided to the coil ends 19 of the stator 10, so that the coil ends 19 can be cooled down.

Further, in the rotary electric machine 100 of the first embodiment, the communication passages 20 and the projection portions 30 are placed in the whole circumference of the outer peripheral surface of the stator core 11 except parts where the fixed portions 40 are provided. Accordingly, after the refrigerant flowing through the communication passages 20 placed in the upper half part of the stator core 11 cools down the stator core 11 from its inner peripheral surface and flows out from the openings 23 to the outer peripheral surface of the stator core 11, the refrigerant flows on the outer peripheral surface of the stator core 11 in the circumferential direction or the axial direction, so that the refrigerant cools down the outer peripheral surface of the stator core 11 and the coil ends 19. In the meantime, the refrigerant flowing through the communication passages 20 placed in the lower half part of the stator core 11 cools down a lower side part of the stator core 11 from its inner peripheral surface. This makes it possible to cool down the stator core 11 from the whole circumference, thereby making it possible to improve the cooling performance.

Further, in the rotary electric machine 100 of the first embodiment, the communication passages 20 and the projection portions 30 are placed equally in the circumferential direction. This makes it possible to uniformize the flow of the refrigerant on the outer peripheral surface, thereby making it possible to improve the cooling performance.

Further, in the rotary electric machine 100 of the first embodiment, the communication passages 20 and the projection portions 30 are placed in the whole circumference of the outer peripheral surface of the stator core 11 except parts where the fixed portions 40 are provided. Accordingly, unlike the technologies in the related art as described in JP 2019-30098 A and JP 2015-115994 A, it is not necessary to provide passages in which refrigerant flows in the circumferential direction by dividing a refrigerant rib in the axial direction like the stator core 11. On this account, the projection portions 30 can be placed to extend from the first end to the second end of the stator core 11 in the axial direction. Hereby, more refrigerant can flow to the coil ends 19.

Further, in the rotary electric machine 100, the communication passages 20 of the stator core 11 are placed in the central part of the stator core 11 in the axial direction. This allows the stator core 11 to be uniformly cooled down in the axial direction from its inner peripheral surface, thereby making it possible to improve the cooling performance. Further, the flow of the refrigerant directed from the opening 23 of the communication passage 20 to the opposite sides of the projection portion 30 in the axial direction can be made uniform, thereby making it possible to improve the cooling performance.

In the stator core 11 of the rotary electric machine 100 of the first embodiment as described above, the projection-portion forming portions 30a of the electromagnetic steel sheets 12, 13, 14, the inside-diameter-side slits 21, and the outside-diameter-side slits 22 may be placed in axial symmetry to a rotational central axis 55 of the shaft 51 illustrated in FIG. 1. In this case, the stator core 11 can be formed by rotary lamination of the electromagnetic steel sheets 12, 13, 14.

Figure 7:
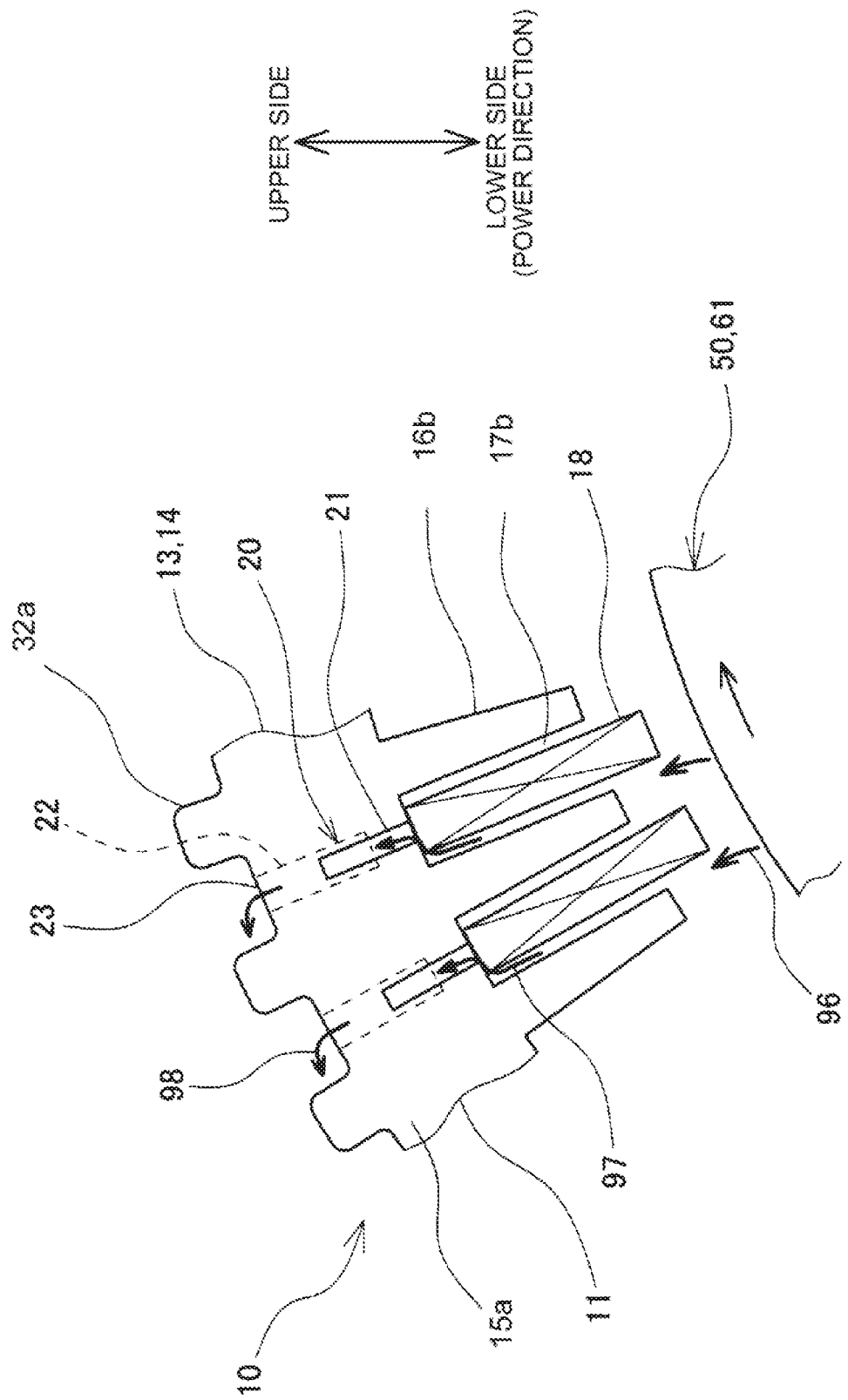
FIG. 7 is a view of an electromagnetic steel sheet, viewed from the axial direction, provided with a communication passage among electromagnetic steel sheets forming a stator core of a rotary electric machine of a second embodiment of the present disclosure.

Further, in the rotary electric machine 100 of the first embodiment described above, the projection portion 30 of the stator core 11 has a semicircular section. However, the present disclosure is not limited to this. Like a rotary electric machine of a second embodiment illustrated in FIG. 7, projection-portion forming portions 32a of the electromagnetic steel sheets 12, 13, 14 may be formed in a square or trapezoidal shape, and projection portions 32 having a square or trapezoidal sectional shape may be formed by laminating the electromagnetic steel sheets 12, 13, 14. In this case, a passage through which the refrigerant flows in the axial direction can be formed between a root of the projection portion 32 and the outer peripheral surface of the stator core 11 even when the communication passage 20 extends downward in the gravitational direction from the horizontal direction. Hereby, the refrigerant can be effectively guided to the coil ends 19.

Figure 8:
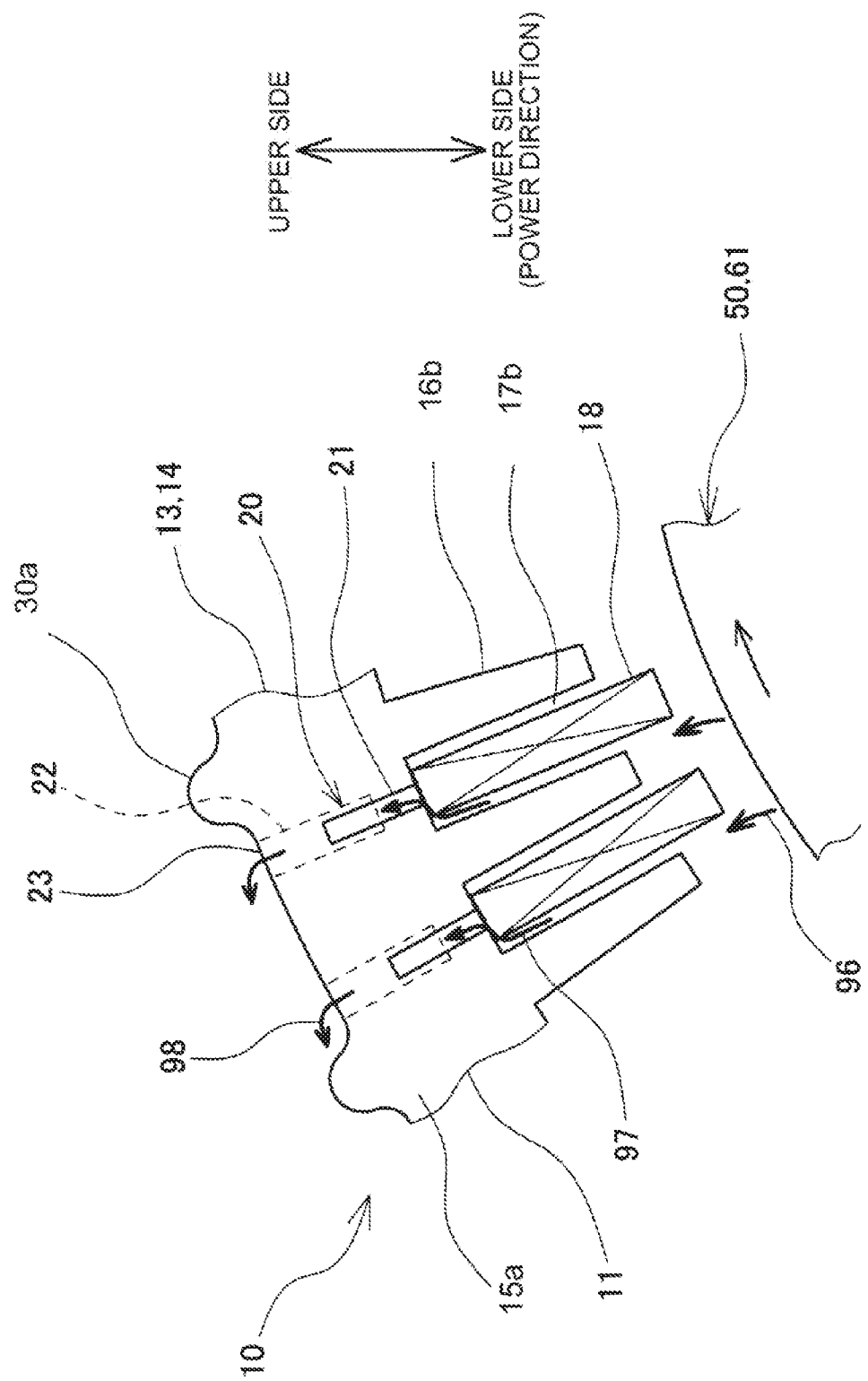
FIG. 8 is a view of an electromagnetic steel sheet, viewed from the axial direction, provided with a communication passage among electromagnetic steel sheets forming a stator core of a rotary electric machine of a third embodiment of the present disclosure.

Further, in the stator core 11 of the rotary electric machine 100 of the first embodiment, one communication passage 20 or opening 23 is placed between the projection portions 30. However, the present disclosure is not limited to this. Like a rotary electric machine of a third embodiment illustrated in FIG. 8, a plurality of communication passages 20 or openings 23 may be placed between the projection portions 30.

Figure 9:
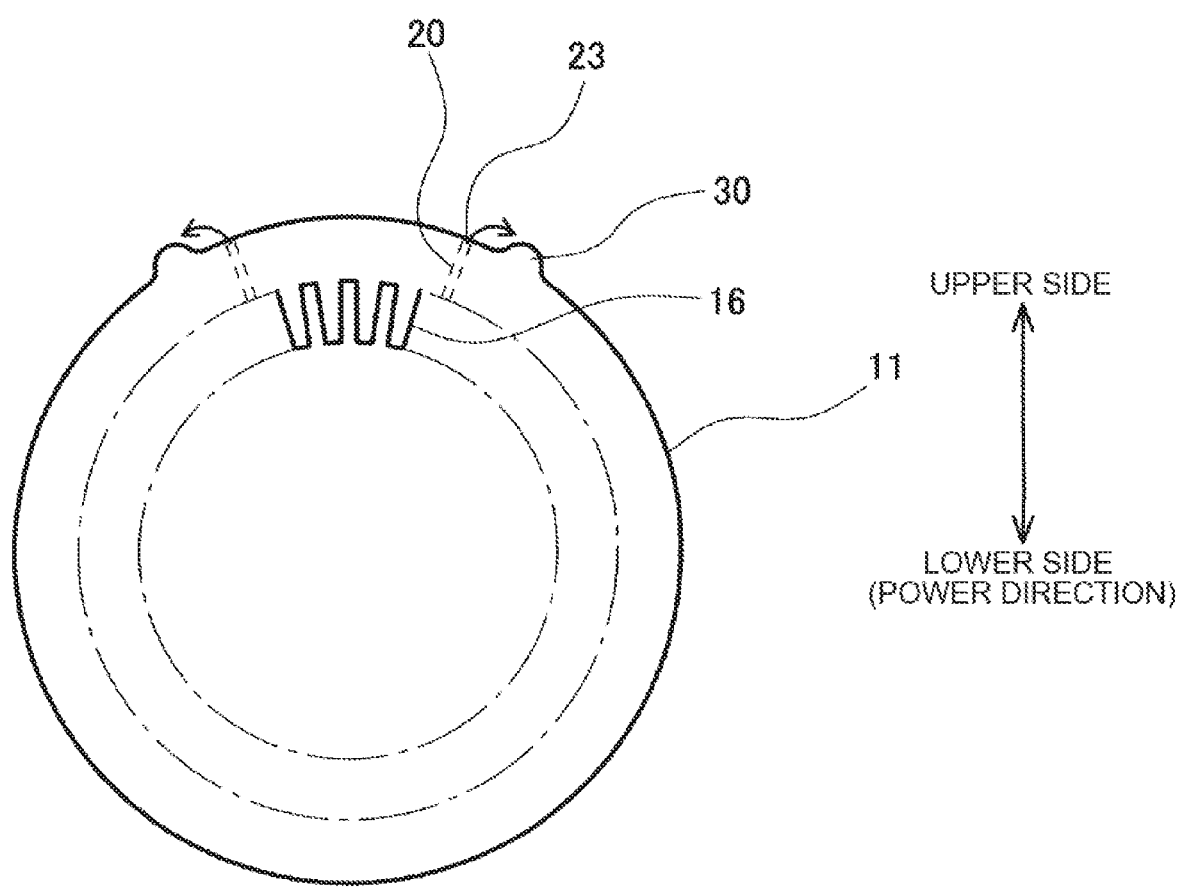
FIG. 9 is a view of a stator core of a rotary electric machine of a fourth embodiment of the present disclosure when the stator core is viewed from the axial direction.

In the rotary electric machine 100 of the first embodiment, the projection portions 30 and the communication passages 20 are placed in the whole circumference of the outer peripheral surface of the stator core 11 except parts where the fixed portions 40 are provided. However, the present disclosure is not limited to this. For example, like a rotary electric machine of a fourth embodiment illustrated in FIG. 9, two projection portions 30 and two communication passages 20 may be placed symmetrically in the right-left direction in respective parts inclined by about 30° in the circumferential direction from the upper side in the gravitational direction. In this case, one opening 23 and one projection portion 30 are placed on a first side face of the stator core 11. In this case, since the projection portion 30 is placed downward in the gravitational direction from the opening 23, the refrigerant flowing out of the opening 23 flows downward along the outer peripheral surface of the stator core 11 and then flows in the axial direction along the projection portion 30, so that the coil ends 19 can be cooled down.

Further, by placing the openings 23 and the projection portions 30 in parts where much heat is generated in the rotary electric machine 100 or in parts difficult to be cooled down in the rotary electric machine 100, the rotary electric machine 100 can be cooled down more efficiently. In this case, one opening 23 and one projection portion 30 may be placed.

Further, in the rotary electric machine 100 of the first embodiment, the stator core 11 is formed in a cylindrical shape by laminating electromagnetic steel sheets. However, the stator core 11 may not be formed by laminating the electromagnetic steel sheets, and the stator core 11 may be formed by compression molding of iron powder, for example. Further, the stator core 11 may not have a cylindrical outside-diameter surface, provided that an inside-diameter surface of the stator core 11 has a tubular cylindrical surface along the outside diameter of the rotor core 61 having a cylindrical shape. For example, the outside-diameter surface of the stator core 11 may have a polygonal shape such as a hexagonal shape or an octagonal shape.

What is claimed is:

1. A rotary electric machine comprising:
    a rotor including a refrigerant passage via which a rotor inner peripheral surface communicates with a rotor outer peripheral surface such that the refrigerant passage guides refrigerant from the rotor inner peripheral surface to the rotor outer peripheral surface, an axial direction of the rotor being along a horizontal direction; and
    a stator placed around the rotor and including a stator core including a communication passage and a projection portion,
    wherein an inner peripheral surface of the stator core communicates with an outer peripheral surface of the stator core via the communication passage,
    wherein the communication passage is configured to guide the refrigerant, which flows out from the refrigerant passage of the rotor to the inner peripheral surface of the stator core, to the outer peripheral surface of the stator core, and
    wherein the projection portion is provided on the outer peripheral surface to extend in an axial direction of the stator core and is placed downward in a gravitational direction from an opening of the communication passage on the outer peripheral surface and the refrigerant falls downward in the gravitational direction from a bottom end of the projection portion.

2. The rotary electric machine according to claim 1, wherein:
    the stator core includes a plurality of fixed portions projecting radially from the outer peripheral surface of the stator core and extending in the axial direction;
    a plurality of communication passages and a plurality of projection portions are provided in a circumferential direction of the stator core;
    the communication passages are placed in a whole circumference of the outer peripheral surface of the stator core except parts where the fixed portions are provided; and
    the projection portions are placed in a whole circumference of the outer peripheral surface of the stator core except parts where the fixed portions are provided.

3. The rotary electric machine according to claim 2, wherein the communication passages and the projection portions are placed equally in the circumferential direction.

4. The rotary electric machine according to claim 2, wherein:
    the stator core is formed in a tubular shape by laminating toric electromagnetic steel sheets; and
    the communication passages are placed in axial symmetry to a rotational central axis of the rotor and the projection portions are placed in axial symmetry to a rotational central axis of the rotor.

5. The rotary electric machine according to claim 2, wherein:
    the stator core is formed in a tubular shape by laminating plates each formed in a toric shape by compression molding of iron powder; and
    the communication passages are placed in axial symmetry to a rotational central axis of the rotor and the projection portions are placed in axial symmetry to a rotational central axis of the rotor.

6. The rotary electric machine according to claim 1, wherein a plurality of projection portions extends from a first end of the stator core to a second end of the stator core in the axial direction.

7. The rotary electric machine according to claim 1, wherein a plurality of communication passages is placed in a central part of the stator core in the axial direction.

8. The rotary electric machine according to claim 1, wherein the projection portion has a square or trapezoidal sectional shape.

9. The rotary electric machine according to claim 1, wherein the refrigerant that flows out to the outer peripheral surface flows downward in the gravitational direction along the outer peripheral surface of the stator core and surfaces of the projection portion by surface tension.

* * * * *